United States Patent [19]

Katz

[11] Patent Number: 5,765,588
[45] Date of Patent: Jun. 16, 1998

[54] FLUID FLOW CONTROL DEVICE PARTICULARLY USEFUL AS A PRESSURE REGULATOR

[75] Inventor: Oded Katz, Doar Na Menashe, Israel

[73] Assignee: Plasson Maagon Michael Industries Ltd., Doar Na Menashe, Israel

[21] Appl. No.: 621,554

[22] Filed: Mar. 25, 1996

[51] Int. Cl.$^6$ ............................................. F16K 11/00
[52] U.S. Cl. ............... 137/238; 137/625.32; 137/505.18; 137/505.46; 137/505.41
[58] Field of Search ............... 137/599.1, 625.29, 137/625.32, 505.18, 505.38, 505.39, 505.41, 505.46, 238

[56] References Cited

U.S. PATENT DOCUMENTS

| | | | |
|---|---|---|---|
| 476,755 | 6/1892 | Mills | 137/505.18 |
| 2,707,966 | 5/1955 | Taplin | 137/505.18 |
| 2,960,107 | 11/1960 | Falconer | 137/505.18 |
| 4,344,456 | 8/1982 | Hostetler | 137/505.46 |
| 5,139,050 | 8/1992 | Otto | 137/625.29 |
| 5,186,209 | 2/1993 | McManigal | 137/505.18 |
| 5,358,004 | 10/1994 | Atkinson | 137/505.18 |
| 5,429,072 | 7/1995 | Schumacher | 137/505.46 |

*Primary Examiner*—Denise L. Ferensic
*Assistant Examiner*—Ramyar Farid
*Attorney, Agent, or Firm*—Benjamin J. Barish

[57] ABSTRACT

A fluid flow control device particularly useful as a pressure regulator in a water supply system for poultry or other animals, includes a valve member movable towards and away from a valve opening in the housing to control the flow therethrough; a first diaphragm exposed to the outlet pressure producing a force tending to move the valve member towards the valve opening; a spring producing a force tending to move the valve member away from the valve opening; and a second diaphragm having an effective surface area exposed to the inlet pressure which is substantially the same as the effective surface area of the movable valve member exposed to the inlet pressure so as to substantially balance the forces produced by the inlet pressure on the valve member.

15 Claims, 4 Drawing Sheets

FLUID FLOW CONTROL DEVICE PARTICULARLY USEFUL AS A PRESSURE REGULATOR

FIELD AND BACKGROUND OF THE INVENTION

The present invention relates to fluid flow control devices. The invention is particularly useful as a pressure regulator in a water supply system such as described in my patent application Ser. No. 08/435,430, filed May 10, 1995, and is therefore described below with respect to such an application.

My application Ser. No. 08/435,430 discloses a water supply system for supplying water to poultry or other animals via a nipple drinker line. Such a water supply system supplies the water to the nipple drinker line via a pressure regulator which reduces the inlet pressure and regulates the outlet pressure. The pressure regulator must regulate the outlet pressure within very narrow tolerances, must be capable of accurate and sensitive adjustment within a wide range, must be substantially independent of variations in the inlet pressure, and must have a relatively high flow capacity.

OBJECTS AND BRIEF SUMMARY OF THE PRESENT INVENTION

An object of the present invention is to provide a fluid flow control device, and particularly a pressure regulator, having advantages in the above respects. Another object of the invention is to provide a pressure regulator for a water supply system particularly useful for supplying water to a nipple drinker line for poultry or other animals such as described in my above-cited patent application Ser. No. 08/435,430. A further object of the invention is to provide a pressure regulator with an integral flushing valve which may be preset to effect a regulating mode of operation, or a flushing mode of operation.

According to the present invention, there is provided a fluid flow control device comprising: a housing having an inlet, an outlet, a connecting passageway between the inlet and outlet, and a valve opening in the connecting passageway; a valve assembly within the housing and having a valve member movable towards and away from the valve opening to control the fluid flow therethrough and to define an inlet chamber on the inlet side of the valve opening subject to the inlet pressure, and an outlet chamber on the outlet side of the valve opening subject to the outlet pressure; a first diaphragm acting on the valve assembly and having an effective surface area exposed to the outlet pressure producing a force tending to move the valve member towards the valve opening to restrict the flow therethrough; and a spring acting on the valve assembly producing a force tending to move the valve member away from the valve opening to increase the flow therethrough. The movable valve member has an effective surface area exposed to the inlet pressure producing a force tending to move the valve member towards the valve opening. The fluid flow control device includes a second diaphragm acting on the valve assembly and having an effective surface area exposed to the inlet pressure which is substantially the same as, the effective surface area of the movable valve member exposed to the inlet pressure, the effective surface area of the second diaphragm producing a force tending to move the valve member away from the valve opening, thereby substantially balancing the force produced by the inlet pressure on the valve member.

The housing is further formed with a cylindrical cavity, and a manually-rotatable hollow cylinder is received within the cylindrical cavity. The hollow cylinder includes a partition extending transversely across the interior of the hollow cavity and slanted with respect to the longitudinal axis of the hollow cylinder. A first opening is formed through the hollow cylinder on one side of the partition, a second opening is formed through the hollow cylinder on the same side of the partition but on the opposite side of the hollow cylinder as the first opening, and a third opening is formed through the hollow cylinder on the opposite side of the partition as the first opening and in axial alignment with the first opening. The second opening is larger than the first opening. The cylindrical cavity is formed with a fourth opening, such that: in a first rotary position of the hollow cylinder, the third opening is aligned with the inlet to direct fluid from the inlet to the inlet chamber and thereby to produce a regulating mode of operation, and in a second rotary position of the hollow cylinder, 180° from the first rotary position, the second and first openings in the cylinder are aligned with the inlet and the fourth opening in the cylindrical cavity to direct the fluid from the inlet directly to the outlet chamber, thereby to produce a flushing mode of operation.

As will be described more particularly below, such a device is particularly useful as a pressure regulator in a water supply system for a nipple drinker line, as described in my patent application 08/435,430, since the balance of forces produced by the inlet pressure renders the device to be substantially insensitive to variations in the inlet pressure. Such an arrangement also enables the device to be provided with a large valve member, and therefore a large valve opening, producing a high flow capacity.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
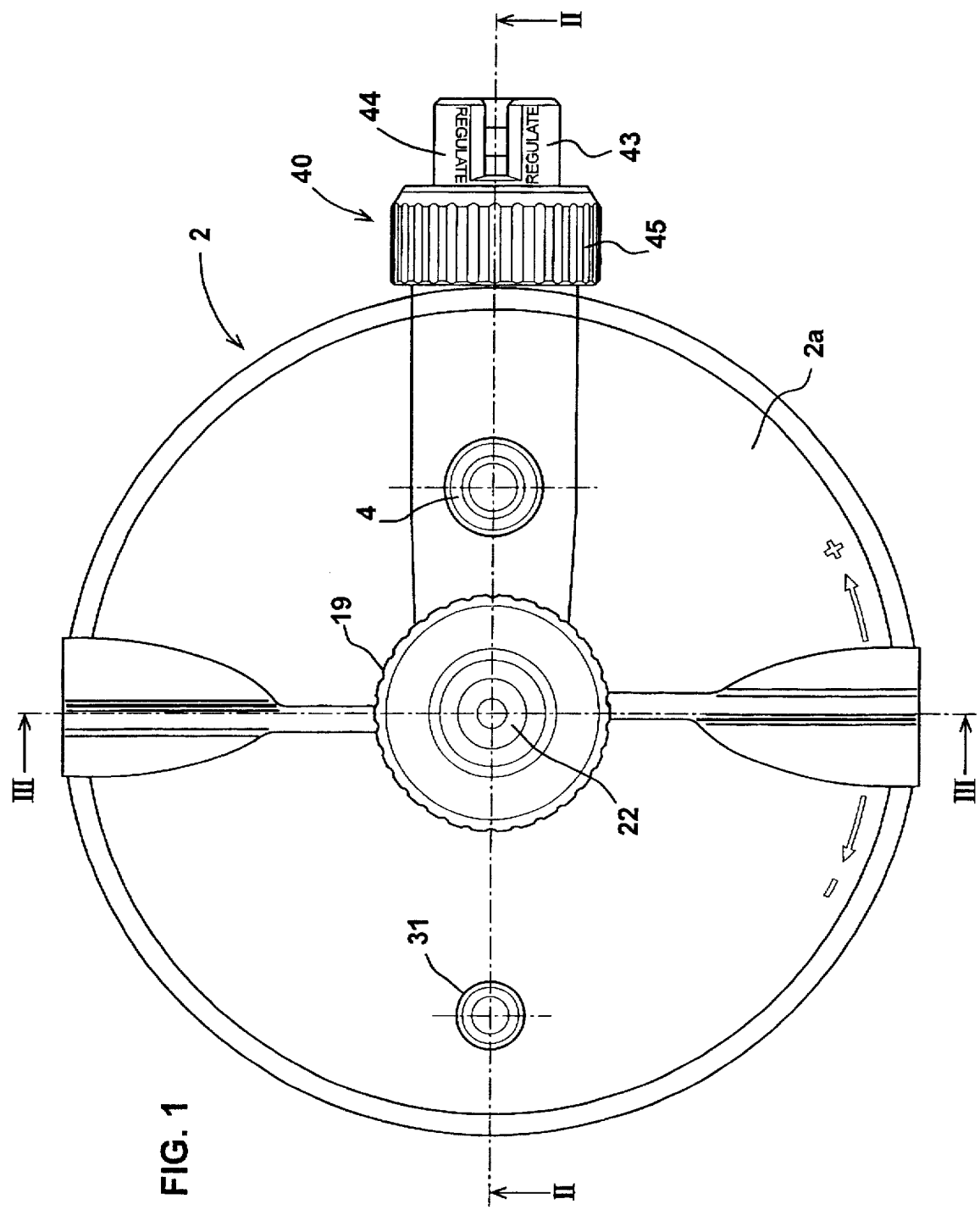
FIG. 1 is a top plan view illustrating one form of fluid flow control device constructed in accordance with the present invention.

The fluid flow control device illustrated in the drawings is particularly useful as a pressure regulator for a water supply line such as used for supplying water to a nipple drinker system for poultry or other animals, e.g., as described in the above-cited patent application Ser. No. 08/435,430. The device includes a housing, generally designated 2, of two half-sections 2a, 2b secured together by fasteners 3. Housing section 2a is integrally formed with an inlet connector 4 for connection to a water supply pipe, and with an outlet connector 5 for connection to an outlet pipe. The pressure regulator reduces the inlet pressure (Pi) to produce a lower outlet pressure (Po) which remains constant substantially independent of variations in the inlet pressure.

Housing 2 further includes a diaphragm 7 extending between the two housing sections 2a, 2b. The outer periphery of diaphragm 7 is clamped between the two sections by fasteners 3.

Housing section 2a is further formed with a valve opening 8 in the connecting passageway between the inlet 4 and the outlet 5. Also disposed within the housing is a valve assembly generally designated 10, which includes a valve member 11 movable towards and away from valve opening 8 to control the water flow through that opening. Thus, valve opening 8, together with valve member 11, define an inlet chamber $C_1$ on the inlet side of valve opening 8 which is subject to the inlet pressure Pi, and an outlet chamber $C_2$ on the outlet side of the valve opening bordered by diaphragm 7, which outlet chamber is subject to the outlet pressure Po.

Valve member 11 is in the form of a sealing ring of elastomeric material and is carried by a stem 12 extending through the valve opening 8. Stem 12 is constituted of two sections 12a, 12b, which are clamped together, with the valve member between them, by a pin or bolt 13 extending through both stem sections. Bolt 13 includes an enlarged head 14 at one end and a nut 15 threaded in its opposite end. Bolt 13 also extends through diaphragm 7 and also through a backing plate 16 on the opposite side of the diaphragm.

A smaller diaphragm 17 is secured to the opposite end of valve assembly 10 by a washer 18 received over that end of bolt 13 and engageable with its enlarged head 14. The outer periphery of diaphragm 17 is secured to housing section 2a by a cap 19 threaded onto a cylinder 20 integrally formed with housing section 2a. A sealing ring 21 is interposed between the end of cylinder 20 and cap 19 to seal the interior of the housing inwardly of diaphragm 17. The outer surface of diaphragm 17 is vented to the atmosphere by an opening 22 formed in cap 19.

Housing section 2b is also integrally formed with a cylinder 23. Cylinder 23 encloses a coil spring 24 which spring-urges diaphragm 7 towards the valve opening 8 to open the valve.

A spring adjusting member 25 is received within cylinder 23 and is formed with an externally threaded pin 26 coaxial with the spring 24. Pin 26 receives an internally threaded nut 27 which serves as a seat for one end of spring 24. Backing plate 16 of diaphragm 7 is formed with a seat 28 for the opposite end of the spring.

Nut 27 is non-rotatably received within cylinder 23 so that rotation of spring adjusting member 25 will move nut 27 only in the axial direction, to change the force applied by spring 24 to diaphragm 7. For this purpose, the inner surface of cylinder 23 is formed with a pair of ribs 29 receiving complementary recesses formed in nut 27, so that nut 27 will not rotate with the rotation of spring adjusting member 25, but rather will move only in the axial direction by the external threads formed in pin 26 engaging the internal threads formed in the nut.

The interior of housing 2 on the spring 24 side of diaphragm 7 is vented to the atmosphere by a bore 30 formed through pin 26.

It will thus be seen that the interior of housing 2 is divided into an inlet chamber $C_1$ on the inlet 4 side of valve opening 8, subject to the inlet pressure Pi; and an outlet chamber $C_2$ on the outlet 5 side of valve opening 8 and subject to the outlet pressure Po. One side of diaphragm 7 is subject to the outlet pressure Po, whereas one side of the smaller diaphragm 17 is subject to the inlet pressure Pi. The opposite side of diaphragm 7 is exposed to the pressure within chamber $C_3$ defined by the diaphragm and housing section 2b, which chamber is at atmospheric pressure via bore 30; and the opposite side of the smaller diaphragm 17 is exposed to the pressure within chamber $C_4$ defined by cap 19, which pressure is also atmospheric via opening 22 in the cap.

Housing section 2a further includes a cylindrical connector 31 exposed to the outlet pressure Po within chamber $C_2$. This connector is to be connected to a pressure indicator, such as a transparent vertical sight tube (not shown), for providing a visual indication of the outlet pressure Po.

The device illustrated in the drawings further includes an integral flushing valve, generally designated 40, which may be manually preset to effect either a regulating mode of operation by means of valve assembly 10, or a flushing mode of operation bypassing valve assembly 10 and conducting the inletted water directly into the outlet chamber $C_2$ for purposes of flushing the line downstream of the valve.

Flushing valve 40 includes a hollow cylinder 41 rotatably received within a cylindrical cavity 42 formed in housing section 2a. Cylinder 41 is formed with an external knob 43 permitting the cylinder to be manually rotated either to the position illustrated in FIG. 2 to effect a regulating mode of operation, or to the position illustrated in FIG. 4 to effect a flushing mode of operation. As shown in FIG. 1, the outer surface of knob 43 may carry indicia 44 to indicate the regulating mode of operation, and further indicia (not shown) on the opposite face to indicate the flushing mode of operation. Cylinder 41 may be securely retained in either position by a nut 45.

Hollow cylinder 41 is formed with two transverse partitions 46, 47. Partition 46 extends transversely across the hollow cylinder perpendicularly to its longitudinal axis, whereas partition 47 extends transversely across the hollow cylinder but an angle to its longitudinal axis.

The portion of hollow cylinder 41 between the two partitions 46, 47 is formed with a relatively small opening 48 on one side of the partition, and a second opening 49 on the same side of the partition but on the opposite side of the cylinder. The portion of hollow cylinder 41 between the slanted partition 47 and the open end of the cylinder is formed with a third opening 50 alignment with opening 48 but on the opposite side of partition 47 The portion of housing section 2a formed with the cylindrical cavity 42 includes a fourth 51 leading into the outlet chamber $C_2$. As shown in the drawings, the second opening, namely opening 49, is larger than opening 48 (as well as opening 50) such that when hollow cylinder 41 is located in the position illustrated in FIG. 2, its opening 50 is aligned with the inlet 4, thereby directing the water from the inlet, through opening 50 and the interior of the hollow cylinder into the inlet chamber $C_1$; this will effect a regulating mode of operation as will be described more particularly below. On the other hand, when hollow cylinder 41 is rotated 180° to the position shown in FIG. 4, its two openings 48, 49 between the two partitions 46, 47 are aligned with the inlet 4, thereby conducting the water from the inlet 4 directly via opening 51 into the outlet chamber $C_2$, to effect a flushing mode of operation.

Figure 2:
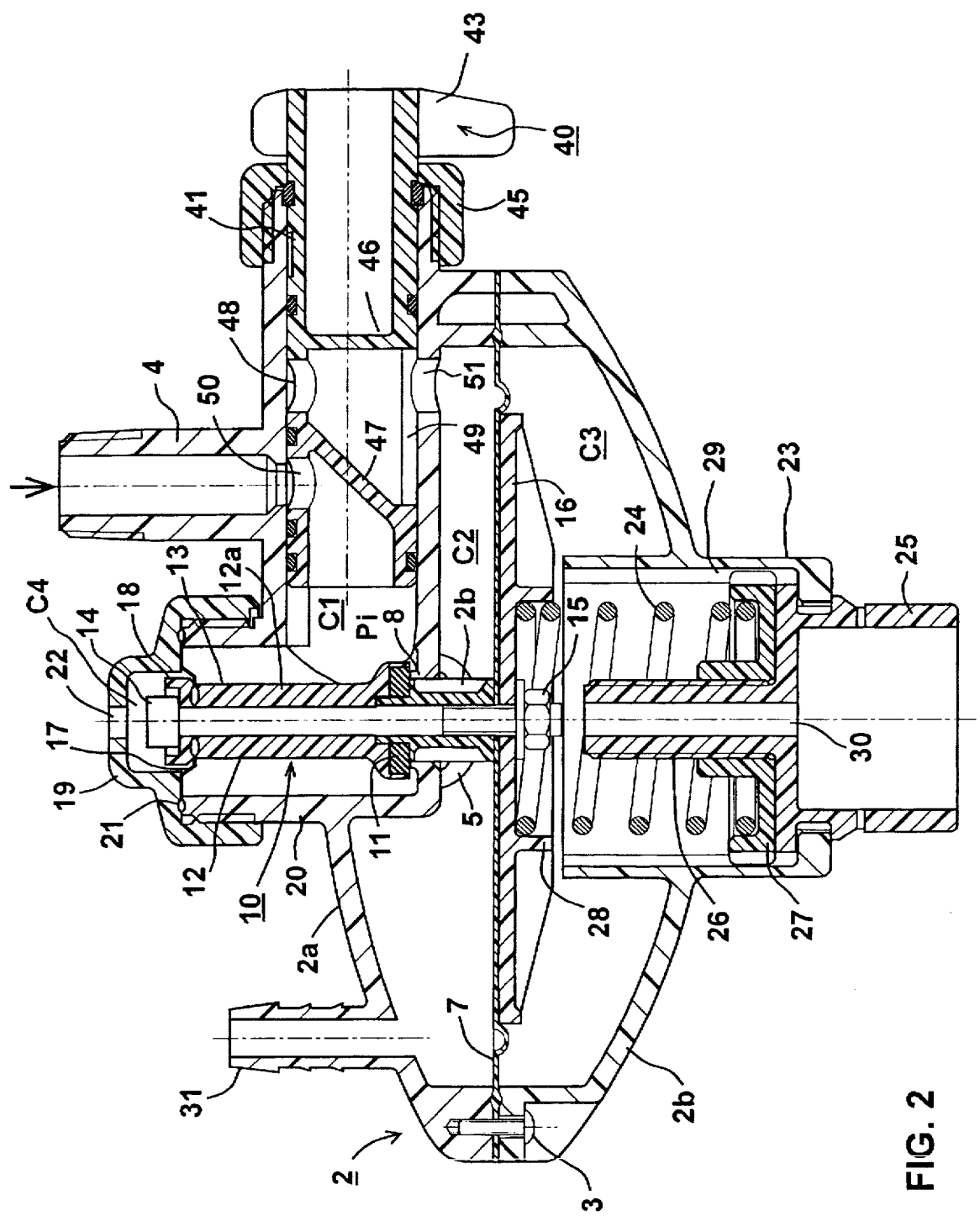
FIG. 2 is a sectional view along line II—II of FIG. 1.
Figure 3:
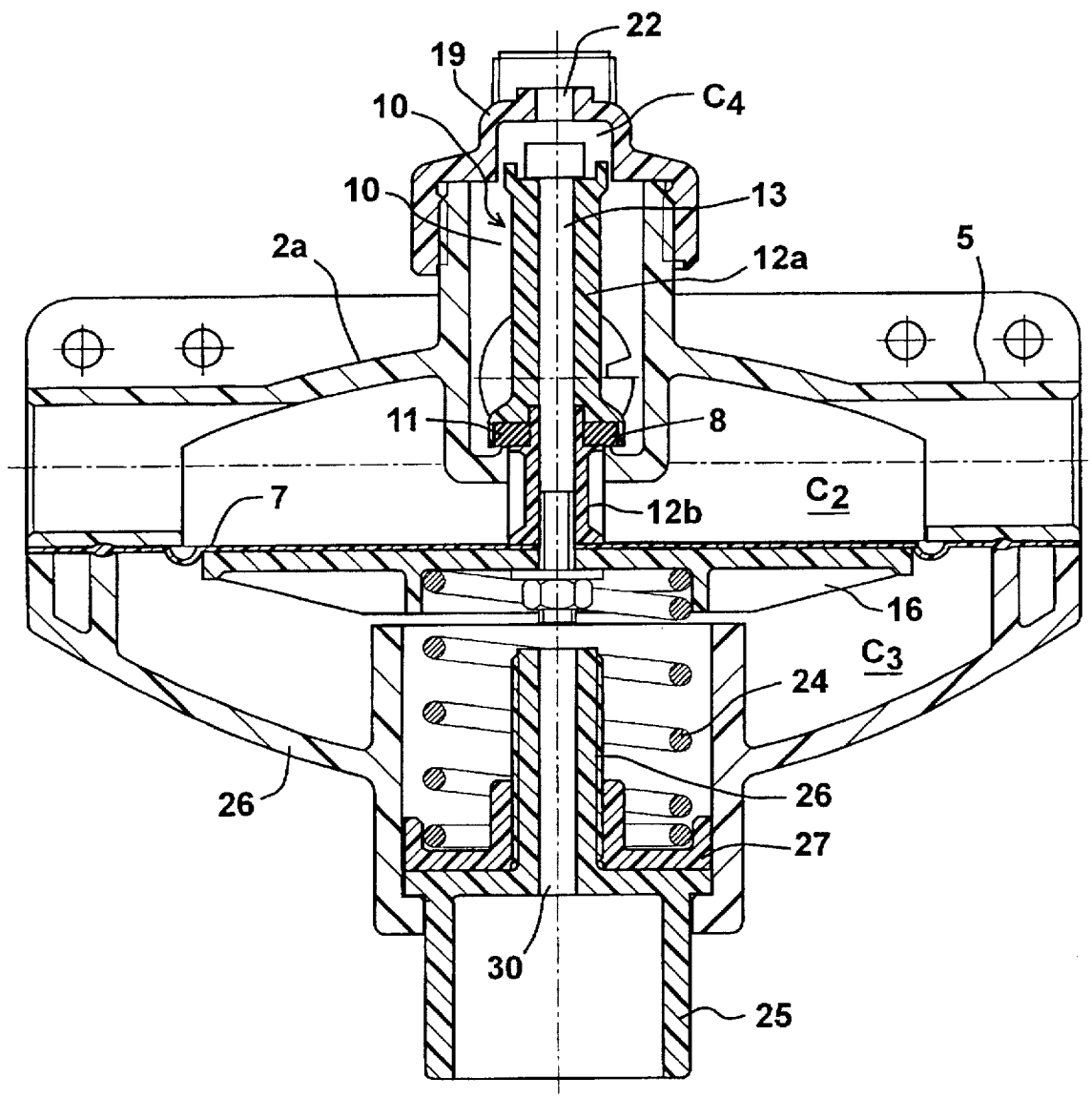
FIG. 3 is a sectional view along line III—III of FIG. 1.

The pressure regulator illustrated in the drawings operates as follows:

If the pressure regulator is to be operated according to the regulating mode, flushing valve 40 would be positioned as shown in FIG. 2, wherein the water is directed from inlet 4 via opening 50 and the interior of hollow cylinder 41 into the inlet chamber $C_1$. The forces produced on valve assembly 10 are as follows:

Since the large diaphragm 7 has an effective surface area exposed to the outlet pressure Po within chamber $C_2$, this pressure produces a force tending to move valve member 11 of valve assembly 10 towards valve opening 8, i.e., to restrict or close the passageway through valve opening 8 from the inlet chamber $C_1$ to the outlet chamber $C_2$. On the other hand, spring 24, which acts on diaphragm 7 and via that diaphragm on valve assembly 10, produces a force tending to move valve member 11 away from the valve opening 8, to enlarge the passageway through that opening. The force produced by spring 24 determines the outlet pressure Po; this outlet pressure can be preset by rotating spring adjusting member 25 to increase or decrease the spring force applied against diaphragm 7.

The inlet pressure Pi within the inlet chamber $C_1$ applied to valve member 11 produces a force tending to move that valve member towards valve opening 8. This force is counteracted by the force produced by the inlet pressure Pi against the smaller diaphragm 17, which force tends to move the valve assembly 10, and its valve member 11, away from the valve opening 8. Accordingly, the effective surface area of diaphragm 17 exposed to the inlet pressure Pi is to be substantially the same as the surface area of valve member 11 exposed to the inlet pressure Pi so that the two forces produced by the inlet pressure Pi will substantially balance each other. Thus, the outlet pressure Po appearing at the outlet 5 of the pressure regulator illustrated in the drawings will be substantially independent of variations or fluctuations in the inlet pressure Pi.

Whenever it is desired to preset another outlet pressure Po, this may be conveniently done by merely rotating spring adjusting member 25 to move nut 29 axially within cylinder 23, and thereby to increase or reduce the force applied by spring 24 against diaphragm 7.

Figure 4:
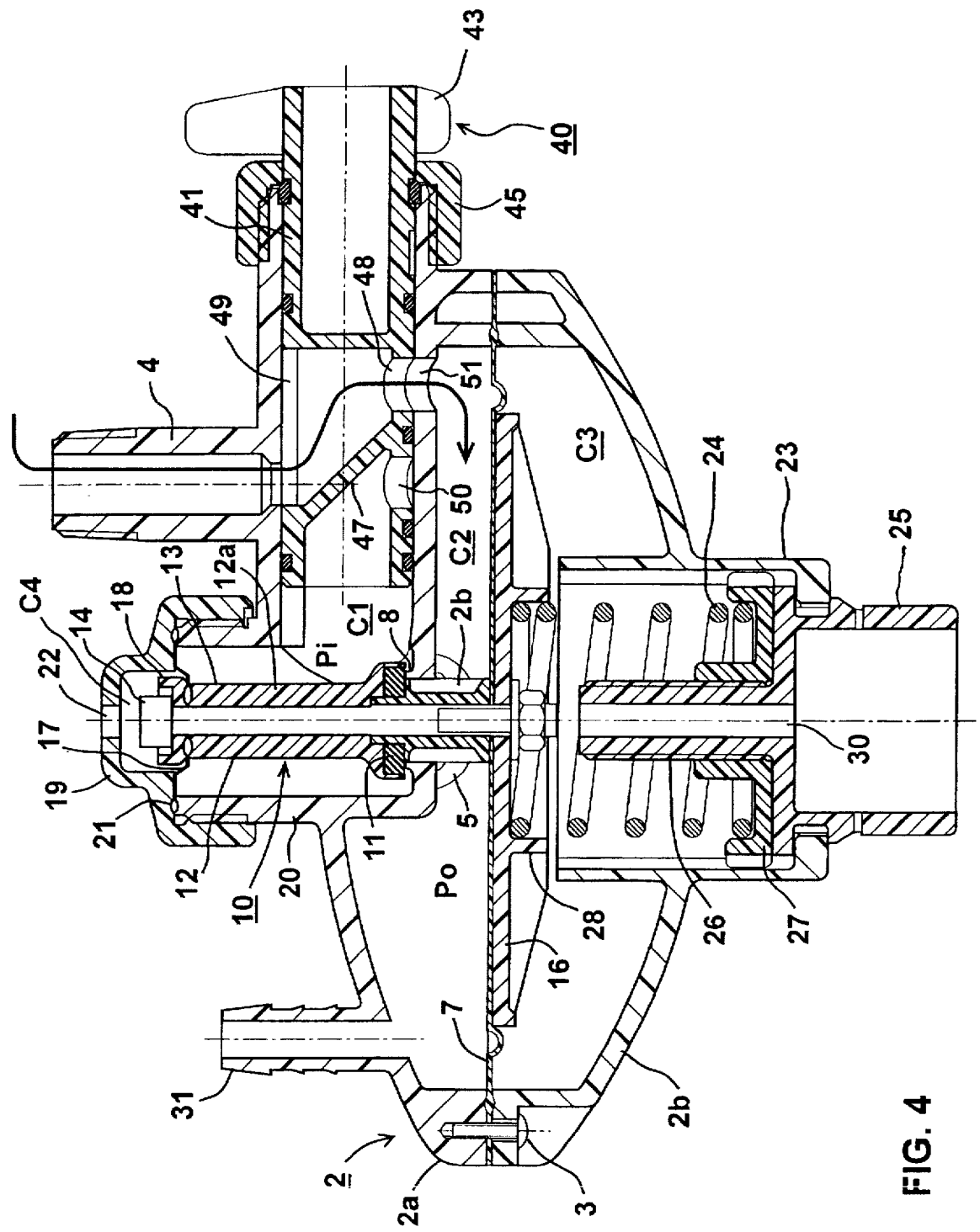
FIG. 4 is a view corresponding to that of FIG. 2 but illustrating the flushing valve effecting a flushing mode of operation.

If it is desired to effect a flushing mode of operation, flushing valve 40 is rotated 180° to the position illustrated in FIG. 4. In this position, the inlet 4 is connected via openings 48, 49 and 51 directly to the outlet chamber $C_2$, thereby bypassing the valve assembly 10 and its valve opening 8. Accordingly, the inletted water will flow at a high, unregulated, rate directly into the outlet chamber $C_2$ and to the outlet 5 to flush the line downstream of the pressure regulator.

While the invention has been described with respect to one preferred embodiment, it will be appreciated that this is set forth merely for purposes of example, and that many other variations, modifications and applications of the invention may be made.

I claim:

1. A fluid flow control device, comprising:

a housing having an inlet, an outlet, a connecting passageway between the inlet and outlet, and a valve opening in said connecting passageway;

a valve assembly within said housing and having a valve member movable towards and away from said valve opening to control the fluid flow therethrough and to define an inlet chamber on the inlet side of the valve opening subject to the inlet pressure, and an outlet chamber on the outlet side of the valve opening subject to the outlet pressure;

a first diaphragm acting on the valve assembly and having an effective surface area exposed to the outlet pressure producing a force tending to move the valve member towards the valve opening to restrict the flow therethrough;

a spring acting on the valve assembly producing a force tending to move the valve member away from the valve opening to increase the flow therethrough;

the movable valve member having an effective surface area exposed to the inlet pressure producing a force tending to move the valve member towards the valve opening;

a second diaphragm acting on said valve assembly and having an effective surface area exposed to the inlet pressure which is substantially the same as the effective surface area of the movable valve member exposed to the inlet pressure, said effective surface area of the second diaphragm producing a force tending to move the valve member away from the valve opening, thereby substantially balancing the force produced by the inlet pressure on the valve member;

and a manually-rotatable hollow cylinder received within a cylindrical cavity formed in said housing;

said hollow cylinder including a partition extending transversely across the interior of the hollow cavity and slanted with respect to the longitudinal axis of the hollow cylinder; a first opening through said hollow cylinder on one side of the partition, a second opening through said hollow cylinder on the same side of the partition but on the opposite side of the hollow cylinder as said first opening, and a third opening through said hollow cylinder on the opposite side of the partition as said first opening and in axial alignment with said first opening;

said second opening being larger than said first opening, and said cylindrical cavity being formed with a fourth opening, such that:

in a first rotary position of the hollow cylinder, said third opening is aligned with said inlet to direct fluid from the inlet to said inlet chamber and thereby to produce a regulating mode of operation, and in a second rotary position of the hollow cylinder, 180° from said first rotary position, said second and first openings in the cylinder are aligned with said inlet and said first opening in the cylindrical cavity to direct the fluid from the inlet directly to said outlet chamber, thereby to produce a flushing mode of operation.

2. The device according to claim 1, wherein said valve assembly includes a stem passing through said valve opening; a first end of the stem being secured to said first diaphragm; and a second end of said stem being secured to said second diaphragm.

3. The device according to claim 2, wherein said stem is made of two sections secured together with the valve member clamped between them.

4. The device according to claim 2, wherein said first end of the stem is secured to said first diaphragm by a bolt received in said stem and a nut threaded onto the end of the bolt.

5. The device according to claim 4, wherein said housing includes two sections secured together, said first diaphragm including an outer periphery secured between said two housing sections.

6. The device according to claim 2, wherein said second end of the stem is secured to said second diaphragm by a bolt received in said stem and a nut threaded onto the end of the bolt.

7. The device according to claim 6, wherein said housing includes a cap removably secured to the housing over said valve assembly; said second diaphragm including an outer periphery secured between said cap and said housing.

8. The device according to claim 2, wherein said stem includes a bolt passing through the stem and having an enlarged head at one end engaging one diaphragm and a threaded nut at the opposite end securing the other diaphragm.

9. The device according to claim 8, wherein said housing includes two sections secured together; said first diaphragm including an outer periphery secured between said two housing sections.

10. The device according to claim 9, wherein said housing includes a cap removably secured to the housing over said valve assembly; said second diaphragm including an outer periphery secured between said cap and said housing.

11. The device according to claim 1, wherein said first diaphragm defines with the housing a further chamber vented to the atmosphere, and wherein said spring is a coil spring located within said further chamber between said second diaphgram and the housing.

12. The device according to claim 11, wherein said further chamber includes a manually adjustable member accessible externally of said housing for adjusting the force applied by the spring against said first diaphragm.

13. The device according to claim 12, wherein said manually adjustable member is rotatable and includes a pin threadedly receiving a nut which is non-rotatably received within said further chamber such that rotation of the manually adjustable member and its pin moves the nut axially to compress or expand said spring, and thereby to adjust the force applied by the spring against said first diaphragm.

14. The device according to claim 13, wherein said further chamber is formed with a cylindrical wall having an axially-extending rib received within an axially-extending groove formed on the outer surface of the nut.

15. The device according to claim 1, wherein said housing includes an outlet connection communicating with said outlet chamber for connection to a pressure indicator for indicating the pressure in the outlet chamber.

\* \* \* \* \*